Oct. 28, 1924.
A. PETERS
1,513,625
GLASS GUARD FOR MINERS' INCANDESCENT LAMPS
Filed Feb. 26, 1924
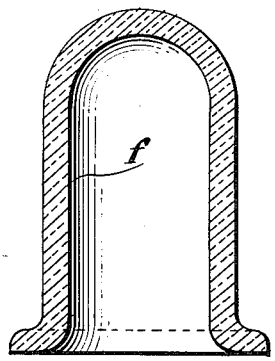
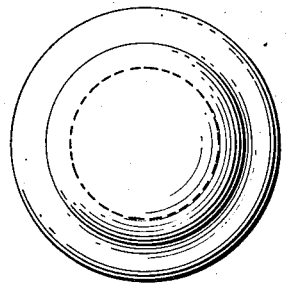
Inventor
Anton Peters
By B. Singer
Attorney Patented Oct. 28, 1924.

1,513,625

UNITED STATES PATENT OFFICE.

ANTON PETERS, OF DORTMUND, GERMANY.

GLASS GUARD FOR MINERS' INCANDESCENT LAMPS.

Application filed February 26, 1924. Serial No. 695,232.

*To all whom it may concern:*

Be it known that I, ANTON PETERS, citizen of the German Republic, residing at Dortmund, Germany, have invented new and useful Improvements in Glass Guards for Miners' Incandescent Lamps, of which the following is a specification.

My invention relates to an improved method of making glass guards for the bulbs of miners' incandescent lamps. Such guards, in order to afford the protection required under the conditions of mine operation, should have a wall thickness of $\frac{3}{16}$ to $\frac{1}{4}$ in. Glass walls of this thickness, however, involve very obnoxious phenomena of refraction so that the light of such a lamp when projected on a surface, forms thereon a striped pattern of light and comparatively dark areas.

Apart from this, the shadows of the lamp holder rods are very marked, being about 1½ feet wide at a distance of two yards from the lamp.

Obviously, these stripes and shadows are very troublesome to the miners, and, when performing difficult operations, such as blasting and drilling, they are under the necessity of frequently adjusting their lamps so that said shadows etc. are not projected on the place under operation.

Lamps having clear glass guards emit a dazzling light which irritates the eye and often causes eye diseases, for instance the well known nystagmus.

Attempts to overcome these drawbacks have heretofore resulted in failure. Guards of opal glass were proposed but proved unsatisfactory because this glass, if thick enough to form an effective guard, absorbs too high a percentage of the light and the troublesome shadows of the holder rods remain.

It is an object of my invention to provide an improved method of making a guard for the purpose specified which removes all the drawbacks indicated above. With this object in view, I form on the glass guard a thin coating of transparent mineral powder. Preferably, minerals containing a high percentage of silica will be used. This coating does away with all obnoxious effects of refraction and reflexion, the light of the lamps becomes extremely soft and pleasant, no radiating heat is emitted and the range of the lamp is much increased. The coating absorbs only about 5 per cent of the light and this small loss is made up for by the increase of the surface illuminated and the uniformity of the light distribution. With the improved guard made in accordance with my method, the range is about 8 feet and the distribution is quite uniform, so that the miners are able to work for a longer period without adjusting their lamps.

A further advantage of the guard made in accordance with my method is the fact that the shadows of the rods disappear. Due to its composition and the crystalline material used, the coating emits diffused light so that the lamp radiates a soft and shadowless light while at the same time the light intensity is practically equal to that of lamps having clear glass guards.

The results of tests made in mines with the improved guard have been very favourable. Lamps provided with such a guard not only are without the drawbacks of the existing guards but also emit a very soft light which is agreeable to the eye and is uniformly distributed over a wider range.

The cost of manufacture is not materially increased by the new coating, while on the other hand the expense of scrapping deteriorated guards is saved.

The guard made in accordance with my improved method facilitates working in the mine, increases the output and saves time.

In the drawings affixed to this specification, I have illustrated a guard by way of example, made by my method.

In the drawings—

Fig. 1 is a longitudinal section, and

Fig. 2 is a plan view of the guard.

The coating $f$ is applied to the inside of the guard. It consists of extremely finely divided, crystalline and transparent minerals which contain silica, for instance, quartz, geyserite, etc. Geyserite is a crystalline mineral of great transparence which contains up to 99 per cent pure silica and is particularly found in the German Taunus Mountains.

The mineral is ground very finely and screened so as to obtain a powder of extremely small grain size. To this powder, a binder is added so that the mixture forms a rather thick paste. Potassium or sodium water glass, linseed oil, glue, etc., may be used as a binder. The percentage of binder to be added should be varied in proportion to the existing temperature so that the mixture will flow readily.

The mixture is applied to the guard, preferably on the inside only, and the guard inverted so that the excess mixture will flow out. The coated guards are then heated in a drying oven at about 50 degrees centigrade. The mixture continues flowing out of the inverted guards so that only a very thin coating remains. The guards are heated for about 12 hours, the temperature being increased to 70 degrees centigrade after the first three hours.

Apparently, a chemical reaction of some kind occurs during this treatment, by which the coating is firmly and intimately combined with the glass. The liquid binder is vaporized during the drying process, the finished guard is perfectly smooth inside and of white colour. The coating is indestructible and is not worn by use.

I claim:

The herein described method of providing a transparent coating for an article of glass or the like, consisting in heating said article, together with a mixture of a binder and finely divided geyserite to a temperature of substantially 50° centigrade for substantially three hours and to substantially 70° centigrade for substantially nine hours thereafter, to cause the binder to be vaporized and the geyserite to be intimately combined with the glass.

In testimony whereof I have signed my name to this specification in the presence of two subscribing witnesses.

ANTON PETERS.

Witnesses:
M. FOLU,
EDW. J. POINLEY.